July 29, 1969  J. KELL  3,458,233
SAFETY BELT ANCHORAGE POINTS
Filed March 6, 1968  2 Sheets-Sheet 1
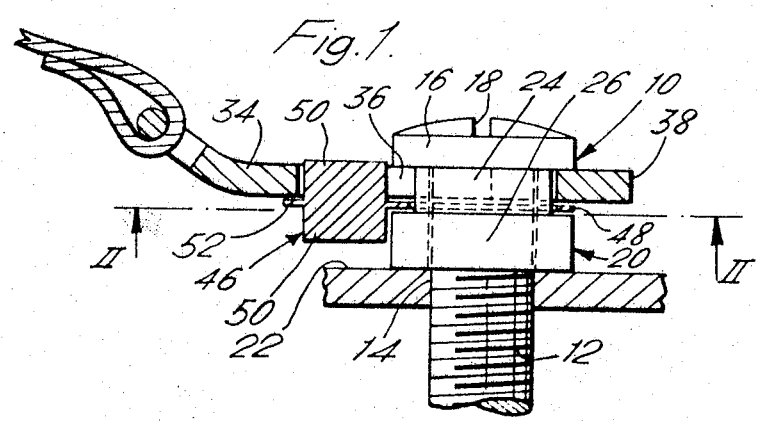
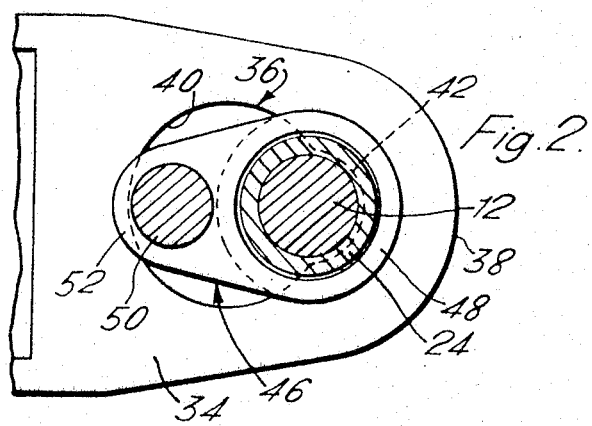
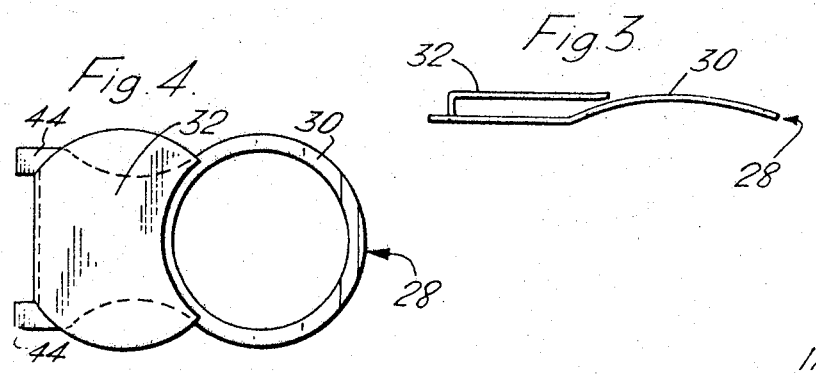
INVENTOR
JOHN KELL
By Young + Thompson
ATTYS.

July 29, 1969  J. KELL  3,458,233
SAFETY BELT ANCHORAGE POINTS

Filed March 6, 1968  2 Sheets-Sheet 2

INVENTOR
JOHN KELL
By Young & Thompson
ATTYS.

United States Patent Office 3,458,233
Patented July 29, 1969

3,458,233
SAFETY BELT ANCHORAGE POINTS
John Kell, Carlisle, Cumberland, England, assignor to Kangol Magnet Limited, Carlisle, Cumberland, England, a British company
Filed Mar. 6, 1968, Ser. No. 710,962
Claims priority, application Great Britain, Mar. 20, 1967, 13,045/67
Int. Cl. B60r 21/10; A47d 15/00
U.S. Cl. 297—385                                    13 Claims

ABSTRACT OF THE DISCLOSURE

A safety belt anchorage device comprises a headed stud for receiving an end member attached to the belt and having a keyhole-like aperture with a larger part for passing over the head and a smaller part for receiving the stem of the stud, together with a springy metal or resilient plastics retaining member for occupying the larger part of the aperture when the belt is attached to the anchorage device.

---

The invention relates to safety belt anchorage devices.

The ends of safety belts provided for the use of, for example, passengers in motor vehicles and aircraft require to be attached to the vehicle or aircraft body by anchorage devices which are secure in use, but which nevertheless allow the belt ends to be readily released and reconnected. The anchorage devices are desirably simple in construction and inexpensive to manufacture. Also, ready connection is desirable in the initial fitting of safety belts, for instance, it is common practice (and legally necessary) in some countries for motor car manufacturers to provide either anchor points or complete safety belt assemblies. An anchor point which can be readily incorporated in the vehicle in manufacture and which allows rapid and safe attachment of a belt is a considerable advantage. The object of the invention is to provide an improved form of such anchoring devices meeting these requirements.

The invention accordingly provides an anchorage device for an apertured safety belt end member, the device having a headed stud for mounting with the head projecting from the vehicle body, the head being able to pass through the aperture at one part thereof but not at a restricted other part which can receive the stem of the headed stud, and a retaining member urged by its own resilience to enter the aperture when the stem is in the restricted end of the aperture, whereby movement of the end member to register the larger end of the aperture with the head is prevented until the retaining member is displaced. The resilient retaining member is conveniently formed with a spring washer portion resiliently bowed along a diameter. This portion is received on the stem of the stud or on a neck-like portion of the stud so as to underlie the belt end member when this is being connected. A tongue portion extending from the washer portion is resiliently depressed beneath the end member during connection until the end member slides to the position in which the stem of the stud is in the narrow end of the aperture, when the tongue portion can spring up into the larger end of the aperture to lock the end member against the sliding movement necessary to release, which is possible only when the tongue is again depressed beneath the end member.

In order that the invention may be readily understood, preferred embodiments thereof are described below by way of example only, in conjunction with the accompanying drawings, in which:

FIG. 1 shows an anchor point with attached belt, in axial cross-section;

FIG. 2 shows a cross-section on the line II—II of FIG. 1;

FIG. 3 shows a side view of one form of resilient spacer;

FIG. 4 shows a plan view of the spacer of FIG. 3;

Figure 5:
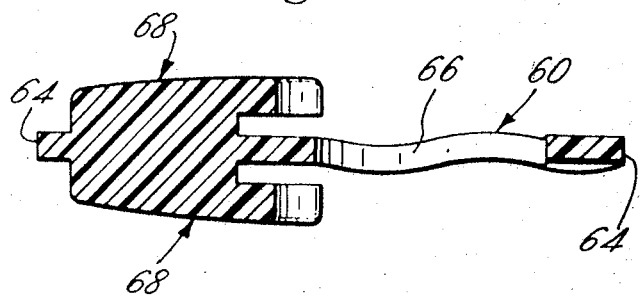
FIG. 5 shows a cross-section of another form of spacer.

The anchorage arrangement shown in FIGS. 1 and 2 consists of a headed securement stud 10 with a threaded lower stem portion 12 for reception in a tapped or other hole 14 in the vehicle body. The head 16 of the stud 10 is suitably shaped to facilitate insertion in the hole 14, as by having a screwdriver slot 18 or by being recessed to receive a key by which the stud 10 can be rotated.

A stepped annular spacer member 20 received on the stem 12 of the stud 10 spaces the head 16 of the stud 10 from the surface 22 of the vehicle body portion in which the stud 10 is secured. The spacer member 20 has an upper portion 24 of lesser outer diameter than the head 16 and a lower portion 26 which is conveniently equal to the head 16 in outer diameter. The spacer upper portion 24 thus provides a neck between the head 16 and the lower portion 26. If preferred the upper spacer portion 24 can be integral with the stud 10, the spacer member 20 then being simply a washer corresponding in shape to the lower portion 26. It is also possible to omit such a washer so that the neck extends between the head 16 and the surface 22 of the body from which the stud 10 projects.

Referring now to FIGS. 3 and 4, a resilient retaining member 28 has an apertured spring portion 30 through which the neck is received and an integral tongue 32 projecting therefrom and twice bent through a right angle. The spring portion 30 is bowed about the diameter at right angles to the tongue axis, as best seen in FIG. 3.

The device described can receive a safety belt end member 34 (FIG. 1) in the form of a plate of generally triangular shape having the belt end looped through a slot adjacent one side, and an aperture 36 between the slot and the protruding apex 38. The aperture 36 has a main part 40 of a size to slip over the head of the stud and a restricted part 42 towards the apex 38 which can receive the neck but then engages the underside of the head 16, so that the plate 34 cannot be released by movement axially of the stud 10 until it has been moved perpendicularly to the stud axis to bring the head 16 into the main part 40 of the aperture 38.

The plate 34 is connected to the anchorage device by placing the larger end 40 of the aperture 38 over the head 16 and pressing down against the resilience of the retaining member 28 until the plate 34 can slide so that the neck is received in the restricted end 42 of the aperture 38. The tongue 32 is then placed radially to spring up into the larger end 40 of the aperture 38, which it can be shaped to occupy completely, though it is sufficient that it engages the aperture end 40. The plate 34 is thus held against sliding movement in its own plane, and can be released only when the tongue 32 has been depressed to below the plate 34.

With the belt end plate 34 in place on the stud 10 in this arrangement, depression of the end of the plate 34 to which the belt is attached might occur by a tilting movement sufficient to bring the part of the plate 34 at the aperture 38 below the level of the tongue 32. To prevent this, the arrangement described can be modified by provision on the tongue 32 of an outwardly extending lip or pair of such lips 44 (FIG. 4) which underlie the plate 34 in the connected position. Conveniently the retaining member 28 can be formed with two such portions projecting from the portion of the tongue 32 extending directly from the apertured spring portion 30 one on each side of the portion upwardly bent therefrom.

In another embodiment of the invention, the stud 10 and spacer member 20 are constituted as previously described but the resilient retaining member is a unitary plastics moulding, for instance the component shown at 46 in FIGS. 1 and 2. The retaining member 46 has an apertured plate-like portion 48 through which the neck of the spacer member 20 is received and a plug portion 50 integral therewith for reception in the belt end plate main aperture 40. The shape of the plug portion 50 can be such as to occupy the main aperture 40 fully in the connected position and the plug portion 50 is desirably formed on an extension 52 of the apertured plate-like portion 48 of larger area than the plug portion 50 itself, so that this extension 52 underlies the belt end plate 34 and functions in the same way as the lip 44 mentioned previously. The operation of the plastics retaining member 46 is effectively the same as the spring metal member 28 described above, the resilience being however provided however provided by the material of the member 46 between the plug portion 50 and the apertured portion 48.

To simplify assembly of the plastics retaining member 46 on the stud 10, the member 46 can be made symmetrical, so that a plug portion 50 is provided on either side of the extension 52. The retaining member 46 can then be placed either way up on the stud 10. The device of the invention incorporating the plastics retaining member 46 desirably also includes a spring washer on the stud or spacer member neck between the lower portion of the spacer member and the retaining member or above the spacer member, so as to act between this and the belt end plate. The spring washer applies pressure axially of the stud to maintain the belt end plate securely against the head of the stud in the connected position.

Figure 6:
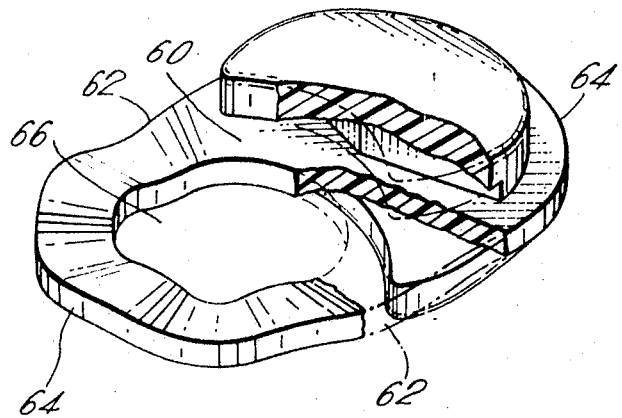
FIG. 6 shows a partly broken-away view of the spacer of FIG. 5.

Another form of symmetrical plastics material resilient retaining member is illustrated in FIGS. 5 and 6. This comprises an elongated central web 60 having straight sides 62 and semicircular ends 64. A large aperture 66 is formed in the web 60 concentrically with one of its ends 64 and the resultant circular portion is preferably given a wavy shape similar to that of a wavy washer. At the opposite end, an undercut plug member 68 is formed on either side of the web 60 and has a part-circular rear surface 70 concentric with the adjacent web end 64 and a pair of opposed straight surfaces 72 meeting at a forward edge 74 on the axis of the retaining member. The surfaces 72 form the base of the undercut portion of the plug member 68, which also includes a forward extension 76 formed by continuation of the part-circular surface 70 and joined by a re-entrant curved surface 78 concentric with the aperture 66. The main surface 80 of the plug member 68 is smooth and slightly bowed to constitute an approximate continuation of the belt end member when in place. The undercut shape provides additional resilience and the wavy shape of the washer-like portion ensures that the space between the spacer and head of the stud member is adequately filled so as to provide a safe retaining function.

However, embodied, the invention thus provides an anchorage device which is simple in construction and may consist of only three or four parts which are held together when mounted on a vehicle even though no belt is connected. Connection of a belt is simple and results in a secure attachment. Release of the belt is also simple, calling only for depression of a resilient member followed by a sliding and lifting movement of the belt and plate. The invention can of course be embodied in various ways other than those described.

I claim:
1. An anchorage device for a safety belt comprising a stud having an enlarged head portion and a stem portion for mounting with the head portion thereof projecting from a vehicle body, a belt and a member attached to the belt and having an elongate aperture including larger and smaller parts thereof, said larger part being of a diameter sufficient to pass over the head portion of the stud, but the smaller part being of a diameter less than that of the head portion of the stud, said smaller part being of sufficient diameter to accommodate the stem portion of the stud, and a resilient retaining member adapted to enter into the larger part of the aperture when the stem portion of the stud is located in the smaller part thereof and adapted to simultaneously engage the stud and the opposed portion of the larger part of the aperture, whereby movement of the belt and member to register the larger part of the aperture with the head portion is prevented until the retaining member is displaced from the aperture.

2. An anchorage device according to claim 1, in which the retaining member comprises a spring washer.

3. An anchorage device according to claim 2, in which the spring washer portion of the retaining member is bowed along a diameter of the washer portion.

4. An anchorage device according to claim 2, in which the retaining member includes a tongue portion extending from the washer portion, the tongue portion being shaped to occupy the larger part of the aperture when the stem of the headed stud is disposed in the restricted part of the aperture.

5. An anchorage device according to claim 4, in which one or more lips is/are provided upon the tongue portion for engaging with the belt end member.

6. An anchorage device according to claim 1, in which the retaining member comprises a unitary plastics component.

7. An anchorage device according to claim 6, in which the retaining member includes an apertured plate-like portion and a plug portion for occupying the larger part of the aperture when the stem of the headed stud is disposed in the restricted part of the aperture.

8. An anchorage device according to claim 7, in which the plug is carried upon an extension of the plate-like portion which extension includes a part which can engage with the belt end member.

9. An anchorage device according to claim 7 in which the retaining member has a plug on either side of the plate-like portion and can be mounted in either of two ways upon the stud.

10. An anchorage device according to claim 7, in which the plug is undercut at its part facing the apertured plate-like portion.

11. An anchorage device according to claim 7, in which the plate-like portion resembles a wavy washer.

12. An anchorage device according to claim 1, in which the headed stud comprises a threaded stems portion, for location in a mounting hole provided for the anchorage device, and a stepped annular spaced member received upon the stem portion which forms with the head of the stud a neck for receiving the restricted part of the aperture in the belt end member.

13. An anchorage device according to claim 12, in which the portion of the spacer member constituting the neck is integral with the stud.

References Cited

UNITED STATES PATENTS

| 218,891 | 8/1879 | Loomis | 151—38 |
| 2,704,680 | 3/1955 | Bedford | 151—41.75 |
| 2,853,113 | 9/1958 | Flora et al. | 151—41.75 |
| 3,049,369 | 8/1962 | Trafton | 151—41.75 |
| 3,271,059 | 9/1966 | Pearson | 287—189.36 |

FOREIGN PATENTS

| 1,030,364 | 5/1966 | Great Britain. |

RAMON S. BRITTS, Primary Examiner

U.S. Cl. X.R.

151—41.75; 287—189.36